United States Patent
Hur et al.

(10) Patent No.: US 10,018,876 B2
(45) Date of Patent: Jul. 10, 2018

(54) LIQUID CRYSTAL DISPLAY AND METHOD OF MANUFACTURE THEREOF

(71) Applicant: Samsung Display Co., Ltd., Yongin-si (KR)

(72) Inventors: Jae Weon Hur, Busan (KR); Min-Sik Jung, Yongin-si (KR); Young Gu Kim, Daejeon (KR); Baek Kyun Jeon, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 26 days.

(21) Appl. No.: 14/941,092

(22) Filed: Nov. 13, 2015

(65) Prior Publication Data

US 2016/0313609 A1 Oct. 27, 2016

(30) Foreign Application Priority Data

Apr. 22, 2015 (KR) ........................ 10-2015-0056764

(51) Int. Cl.
*G02F 1/133* (2006.01)
*G02F 1/1337* (2006.01)
(Continued)

(52) U.S. Cl.
CPC ...... *G02F 1/133784* (2013.01); *G02F 1/1368* (2013.01); *G02F 1/13394* (2013.01); *G02F 1/133512* (2013.01); *G02F 1/133711* (2013.01); *G02F 1/133788* (2013.01); *G02F 1/136227* (2013.01); *G02F 2001/133773* (2013.01)

(58) Field of Classification Search
CPC ........... G02F 1/13378; G02F 1/133784; G02F 1/133788; G02F 1/133512; G02F 1/133711; G02F 1/13394; G02F 1/13627; G02F 2001/13373
See application file for complete search history.

(56) References Cited

U.S. PATENT DOCUMENTS

| 7,884,908 B2 | 2/2011 | Hirota et al. |
| 8,427,613 B2 | 4/2013 | Ohta et al. |

(Continued)

FOREIGN PATENT DOCUMENTS

| KR | 100245052 | 11/1999 |
| KR | 1020120132214 | 12/2012 |

OTHER PUBLICATIONS

English translation by machine translation for KR 10-0245052 provided by KIPO, 1999.*

(Continued)

*Primary Examiner* — Chanceity Robinson
(74) *Attorney, Agent, or Firm* — Cantor Colburn LLP (57) ABSTRACT

A liquid crystal display includes a first substrate and a second substrate facing each other; a pixel electrode disposed on the first substrate; a first alignment layer formed on at least one of the first substrate and the second substrate; a second alignment layer disposed on a same substrate as the first alignment layer, and a liquid crystal layer interposed between the first substrate and the second substrate, where the first alignment layer is a rubbing alignment layer, and the second alignment layer is a photo-alignment layer. A method of manufacturing the liquid crystal display is also provided.

14 Claims, 6 Drawing Sheets

(51) Int. Cl.
*G02F 1/1335* (2006.01)
*G02F 1/1339* (2006.01)
*G02F 1/1368* (2006.01)
*G02F 1/1362* (2006.01)

(56) References Cited

U.S. PATENT DOCUMENTS

2014/0063425 A1 3/2014 Liou et al.
2015/0268494 A1* 9/2015 Yamaguchi ............ G02F 1/1337
349/43

OTHER PUBLICATIONS

English translation by machine translation for KR 10-20120132214 provided by KIPO, 2012.*

* cited by examiner

LIQUID CRYSTAL DISPLAY AND METHOD OF MANUFACTURE THEREOF

This application claims priority to Korean Patent Application No. 10-2015-0056764, filed on Apr. 22, 2015, and all the benefits accruing therefrom under 35 U.S.C. § 119, the content of which in its entirety is incorporated herein by reference.

BACKGROUND (a) Field

This invention relates to a liquid crystal display and a method of manufacture thereof.

(b) Description of the Related Art

Presently, one of the most widely used flat panel displays, a liquid crystal display ("LCD"), includes two display panels formed with electrodes and a liquid crystal layer interposed therebetween. The LCD controls the amount of light that is transmitted by applying signals to the electrodes to realign liquid crystal molecules in the liquid crystal layer.

The LCD includes a thin film transistor array panel and a common electrode panel that face each other. In the thin film transistor array panel, a gate line for transmitting a gate signal and a data line for transmitting a data signal are formed to cross each other, and a thin film transistor connected to the gate and data lines and a pixel electrode connected to the thin film transistor are formed. In the common electrode panel, a light blocking member, a color filter and a common electrode are formed.

Liquid crystal molecules of the LCD may initially be aligned in a predetermined direction by a rubbing process.

A method by which a liquid crystal has a pretilt includes a contact rubbing method of applying physical pressure to an alignment layer by using a roller and a photo alignment method of irradiating ultraviolet rays onto the alignment layer to form the pretilt.

The above information disclosed in this Background section is only to enhance the understanding of the background of the invention and therefore may contain information that does not form the prior art that is already known in this country to a person of ordinary skill in the art.

SUMMARY

This disclosure provides a liquid crystal display and a method of manufacture thereof that prevent light leakage, have a high transmittance and a wide viewing angle.

An exemplary embodiment provides a liquid crystal display, including: a first substrate and a second substrate facing each other; a pixel electrode disposed on the first substrate; a first alignment layer formed on at least one of the first substrate and the second substrate; a second alignment layer disposed on a same substrate as the first alignment layer, and a liquid crystal layer interposed between the first substrate and the second substrate, where the first alignment layer is a rubbing alignment layer and the second alignment layer is a photo-alignment layer.

The second alignment layer may be formed on an area in which a step is formed on the first substrate or the second substrate.

The liquid crystal display may further include a light blocking member formed on the first substrate, and a spacer disposed between the first substrate and the second substrate.

The spacer may be disposed on the light blocking member, and the spacer and the light blocking member may be integrally formed.

The second alignment layer may be disposed on the spacer.

The liquid crystal display may further include a thin film transistor disposed on the first substrate, where a terminal of the thin film transistor and a terminal of the pixel electrode may be connected through a contact hole, and the second alignment layer may be disposed inside the contact hole.

The second alignment layer may be disposed on the first alignment layer, and an entire area of the second alignment layer overlaps the first alignment layer.

The second alignment layer may be disposed on a same layer as the first alignment layer.

The second alignment layer may include a photo-alignment agent that is formed by copolymerizing and reacting at least one of a cyclobutanedianhydride ("CBDA") represented by Chemical Formula 1 and a derivative of the cyclobutanedianhydride represented by the following Chemical Formula 2, and diamine:

[Chemical Formula 1]

[Chemical Formula 2]

where, in Chemical Formula 2, X1, X2, X3, and X4 are hydrogen or an organic compound, and at least one of X1, X2, X3, and X4 has a structure other than hydrogen.

The diamine may include at least one compound represented by Chemical Formula 3 or Chemical Formula 4:

[Chemical Formula 3]

where, in Chemical Formula 3, X is

-continued

, or

, where h of Chemical Formula 3 is a natural number of about 1 to about 10, and h1 and h2 of Chemical Formula 3 are natural numbers selected so that the sum of carbon numbers of the alkylene group of X may be about 2 to about 10.

[Chemical Formula 4]

The diamine may be used in an amount of about 10% to about 50% with respect to the total amount of the photo-alignment agent.

The photo-alignment agent may include a crosslinking agent including at least one of the compounds represented by Chemical Formula 5, Chemical Formula 6 and Chemical Formula 7.

[Chemical Formula 5]

[Chemical Formula 6]

[Chemical Formula 7]

where, in Chemical Formula 5, Chemical Formula 6 and Chemical Formula 7, n is a natural number of about 3 to about 11, each of m1 to m4 is a natural number of about 1 to about 4 independent of each other, each of A1 and A2 is independently where, R is hydrogen or a C1 to C3 alkyl group), a C6 to C30 aromatic compound or a C4 to C20 aliphatic cyclic compound, A3 is

—C—, a C6 to C30 aromatic compound, or a C4 to C20 aliphatic cyclic compound, A4 is a single bond, —CH$_2$—, —COO—, —OCO—, —S—, —O—, a C6 to C30 aromatic compound, or a C4 to C20 aliphatic cyclic compound, and X1, X2, X3, X4, X5, X6, X7, X8, X9, and X10 are each independently —OH, —NH$_2$, an acrylate group, a vinyl group, or In an exemplary embodiment, a method of manufacturing a liquid crystal display, includes: forming a pixel electrode on a first substrate; forming a common electrode on the first substrate or on a second substrate facing the first substrate; and coating a first alignment agent on the first substrate; baking the first alignment agent; partially coating a second alignment agent on the first alignment agent; baking the second alignment agent; and forming a second alignment layer by irradiating polarized light onto the second alignment agent.

The second alignment agent may be coated on an area in which a step is formed on at least one of the first substrate and the second substrate.

The second alignment agent may be coated on the spacer formed on the first substrate or on the second substrate, and is coated inside a contact hole formed in the first substrate.

The first alignment agent and the second alignment agent may be coated using an inkjet method.

According to another exemplary embodiment of the liquid crystal display and method of manufacturing thereof, since a photo-alignment layer may be partially formed on the rubbing alignment layer, a transmittance of a liquid crystal display may be increased, a wide viewing angle may be improved, and/or to light leakage that may occur around a spacer may be reduced or prevented.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

A liquid crystal display according to an exemplary embodiment will be now described with reference to the accompanying drawings.

Figure 1:
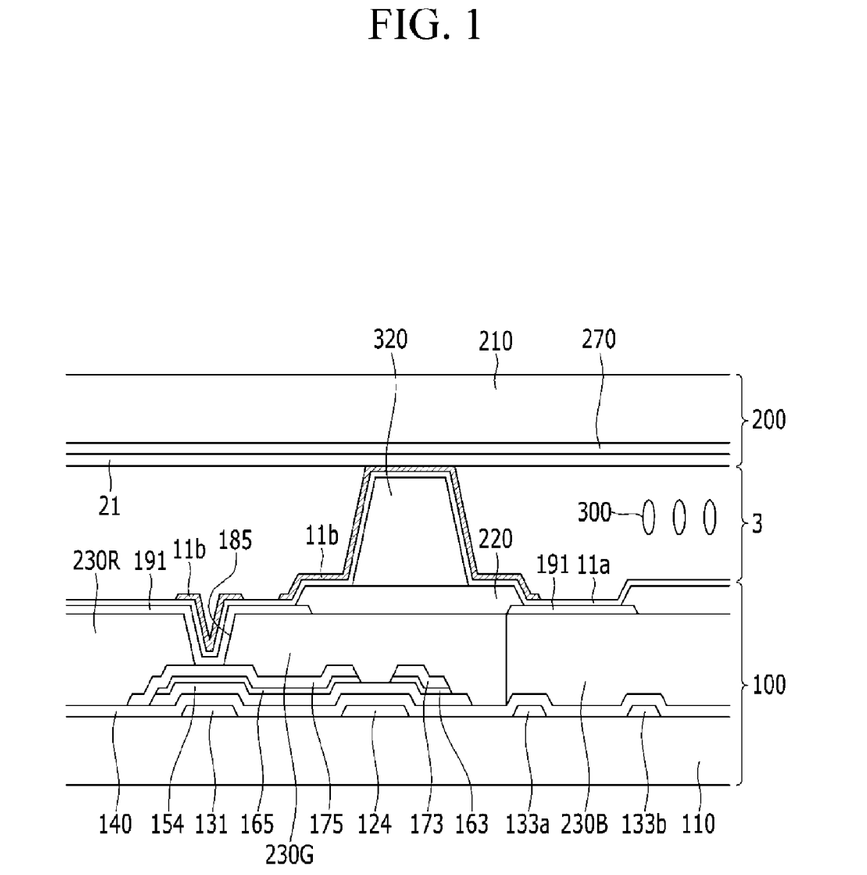
FIG. 1 is a schematic cross-sectional view of an exemplary embodiment of a liquid crystal display.

First, an exemplary embodiment of a liquid crystal display will be described with reference to FIG. 1. FIG. 1 is a cross-sectional view of an exemplary embodiment of a liquid crystal display.

Referring to FIG. 1, an exemplary embodiment of the liquid crystal display includes a lower panel 100 and an upper panel 200 that face each other, and a liquid crystal layer 3 interposed therebetween.

First, the lower panel 100 will be described.

A plurality of gate lines (not shown) and a plurality of storage electrode lines 131 are formed on a first substrate 110 formed of transparent glass, plastic, or the like.

The plurality of gate lines transmits a gate signal, and the gate lines substantially extend in a horizontal direction. Each of the gate lines includes a plurality of gate electrodes 124 protruding downward and a wide end portion (not shown) for connecting to another layer or an external driving circuit. A gate driving circuit (not shown) generating a gate signal may be mounted on a flexible printed circuit film (not shown) attached to the first substrate 110, mounted directly on the first substrate 110, or integrated with the first substrate 110. When the gate driving circuit is integrated with the first substrate 110, the gate line(s) may be directly connected thereto.

The storage electrode line 131 receives a predetermined voltage. The storage electrode 131 includes a stem line substantially extending in parallel with the gate lines, and a plurality of pairs of first and second storage electrodes 133*a* and 133*b* that are branched from the stem line.

The gate lines and the storage electrode line 131 may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), titanium (Ti) or a combination including at least one of the foregoing. The gate lines and the storage electrode line 131 may have a multilayered structure including two conductive layers (not shown) having different physical properties. One conductive layer is made of metal having relatively low resistivity, for example, an aluminum-based metal, a silver-based metal, a copper-based metal, or the like, so as to reduce signal delay or voltage drop. In contrast, other conductive layers are made of other materials, particularly, materials having excellent physical, chemical and electrical contact characteristics with indium tin oxide ("ITO") and indium zinc oxide ("IZO"), such as a molybdenum-based metal, chromium, tantalum, titanium, or the like. In an exemplary embodiment, such a combination may include a lower chromium film and an upper aluminum (alloy) film, and a lower aluminum (alloy) film and an upper molybdenum (alloy) film. However, the gate lines and the storage electrode line 131 may be made of any suitable metal(s), alloys and/or conductor(s) and is not limited to the foregoing metals or alloys.

Side surfaces of the gate lines and the storage electrode line 131 are inclined with respect to the surface of the first substrate 110 by an angle of about 30° to about 80°.

A gate insulating layer 140 that is made of a silicon nitride (SiNx), a silicon oxide (SiOx), or the like, is formed on the gate line and the storage electrode line 131. The gate insulating layer 140 may have a multilayered structure including at least two insulating layers having different physical properties.

A plurality of semiconductor stripe layers made of hydrogenated amorphous silicon (herein, the amorphous silicon is written as an acronym a-Si), polysilicon, or the like, is formed on the gate insulating layer 140. The semiconductor stripe layer mainly extends in a vertical direction. The semiconductor stripe layer includes a plurality of projections 154 protruding toward the gate electrode 124.

An ohmic contact (not shown) and ohmic contact islands 163 and 165 are formed on the semiconductor stripe layer and the projections 154 thereof, respectively.

The ohmic contact islands 163 and 165 may be made of a material such as n+hydrogenated amorphous silicon in which an n-type impurity such as phosphorus is doped at a high concentration, or the ohmic contact islands may be made of silicide.

A data line (not shown) including a source electrode 173 and a data conductor including a drain electrode 175 are formed on the gate insulating layer 140.

The data line transmits a data signal, and the data line mainly extends in a vertical direction to cross the gate line. Each data line crosses the storage electrode line 131, and extends between the adjacent storage electrodes 133a and 133b. Each data line includes a wide end portion (not shown) for connecting a plurality of source electrodes 173 extended toward the gate electrode 124 and another layer or an external driving circuit. A data driving circuit (not shown) generating a data signal may be mounted on a flexible printed circuit film (not shown) attached onto the first substrate 110, mounted directly on the first substrate 110, or integrated with the first substrate 110. When the data driving circuit is integrated with the first substrate 110, the data line extends such that the data line is directly connected thereto.

The drain electrode 175 is separated from the data line and faces the source electrode 173 disposed on the gate electrode 124.

One gate electrode 124, one source electrode 173, and one drain electrode 175 form one thin film transistor ("TFT") together with the semiconductor projections 154, and a channel of the thin film transistor is formed in the projections 154 of the semiconductor layer between the source electrode 173 and the drain electrode 175.

In an exemplary embodiment, the liquid crystal display includes the source electrode 173 disposed on the same line as the data line, and a drain electrode 175 extending in parallel with the data line, thereby broadening the width of the thin film transistor without widening the area occupied by the data conductor, and thus increasing the aperture ratio of the liquid crystal display.

The data line and the drain electrode 175 may be made of a refractory metal such as molybdenum, chromium, tantalum, and titanium, or an alloy thereof, and they may have a multilayer structure including a refractory metal layer (not shown) and a low resistance conductive layer (not shown). Examples of the multilayer structure include a double layer of a chromium or molybdenum (alloy) lower layer and an aluminum (alloy) upper layer, and a triple layer of a molybdenum (alloy) lower layer, an aluminum (alloy) intermediate layer, and a molybdenum (alloy) upper layer.

Color filters 230R, 230G, and 230B are formed on the data line, the drain electrode 175, and an exposed semiconductor layer. The color filters 230R, 230G and 230B may intrinsically display any one the primary colors. For example, the primary colors may include three primary colors, such as red, green, and blue, or yellow, cyan, and magenta, or the like. Although not illustrated, any of the color filters may further include a color filter that displays a mixed color of the primary colors or white in addition to the primary colors. Further, although not illustrated, an overcoat may be additionally formed on the color filter 230.

A plurality of pixel electrodes 191 are formed on the color filters 230R, 230G, and 230B. In an exemplary embodiment, the pixel electrodes 191 may be made of a transparent conductive material such as ITO or IZO, a reflective metal such as aluminum, silver, chromium, or an alloy thereof.

The pixel electrodes 191 are physically and electrically connected to the drain electrode 175 through the contact hole 185, and the pixel electrodes 191 receive a data voltage from the drain electrode 175. The pixel electrodes 191 to which the data voltage is applied generate an electric field together with the common electrode 270 of the common electrode display panel 200 applied with the common voltage, thereby determining a direction of the liquid crystal molecules in the liquid crystal layer 3 between the two pixel electrodes 191 and the common electrode 270. As such, polarization of light passing through the liquid crystal layer 3 is changed depending on the determined direction of the liquid crystal molecules. The pixel electrodes 191 and the common electrode 270 form a capacitor (hereinafter, referred to as a liquid crystal capacitor), so as to maintain the applied voltage even after the thin film transistor is turned off.

The pixel electrodes 191 overlap with the storage electrode line 131 including the storage electrodes 133a and 133b, and the capacitor formed when the pixel electrodes 191 and the drain electrode 175 are electrically connected therewith overlap with the storage electrode line 131, to form a storage capacitor. The storage capacitor improves voltage storage ability of the liquid crystal capacitor.

A light blocking member 220 that may be referred to as a black matrix is formed on the color filters 230R, 230G, and 230B, and the pixel electrodes 191. The light blocking member 220 has a plurality of openings having approximately the same shape as the pixel electrodes 191 and prevents light leakage between the pixel electrodes 191. The light blocking member 220 may be formed from the gate line, a portion corresponding to the data line, and a portion corresponding to the thin film transistor. The light blocking member 220 is formed of a photosensitive material having properties by which light is blocked, except for the exposed portion thereof.

A spacer 320 is formed on the light blocking member 220. The spacer 320 may be formed in and/or on the same layer as the light blocking member 220 or on a different layer. The spacer 320 serves to maintain a gap between a lower panel 100 and an upper panel 200. The spacer 320 of the present exemplary embodiment is formed on the lower panel 100, but is not limited thereto, and in an alternate exemplary embodiment, the spacer may be formed on the upper panel 200.

A first alignment layer 11a is formed on the pixel electrodes 191, the light blocking member 220, and the spacer 320.

In the present exemplary embodiment, the first alignment layer 11a is a rubbing alignment layer that is aligned by a rubbing alignment. Accordingly, the first alignment layer 11a may allow the liquid crystal molecules 300 to be aligned in a direction substantially parallel to the first substrate 110 in a state in which a voltage is not applied to the pixel electrodes 191 and/or the common electrode 270.

For example, after forming an alignment layer by coating alignment agent composition including a resin such as polyimide (PI) or the like on the pixel electrodes 191, the light blocking member 220, and the spacer 320, the first alignment layer 11a is formed by rubbing the coated alignment layer in one direction of the first substrate 110.

In the exemplary embodiment, a second alignment layer 11b is partially formed on the first alignment layer 11a. More specifically, the second alignment layer 11b may be formed on the first alignment layer 11a to cover the spacer 320 and the contact hole 185. The second alignment layer 11b may include a photo-reactive material.

In another exemplary embodiment, the second alignment layer is disposed on a same layer as the first alignment layer.

In an exemplary embodiment of the liquid crystal display, by simultaneously and partially forming the second alignment layer 11b as the photo-alignment layer on the first alignment layer 11a as a rubbing alignment layer formed on the first or second substrate 110 or 210 and on an area in which the stepped portion is formed on the substrates 110 and 210, a rubbing alignment layer with strong alignment anchoring may be provided and light leakage due to the photo-alignment layer may be prevented, particularly on the stepped portion.

Further, in an exemplary embodiment of the liquid crystal display, since the length of the light blocking member 220 that blocks light leakage of the area of the spacer 320 may be reduced by partially forming the photo-alignment layer on the stepped portion such as the spacer 320, high transmittance may be accomplished.

Still referring to FIG. 1, the second alignment layer 11b may be additionally in the area of the contact hole 185 as well as the area of the spacer 320, and the second alignment layer may be formed on not only the spacer 320 and the contact hole 185 but also on the area in which the stepped portion is formed on the first or second substrate.

In an exemplary embodiment, the second alignment layer 11b may be formed with a photo-alignment agent formed by copolymerizing cyclobutanedianhydride ("CBDA") or derivatives of the CBDA and diamine. However, the materials used to form the second alignment layer are not limited thereto and any suitable material may be employed. In an alternate exemplary embodiment, the second alignment layer 11b may be formed with a cyclobutane-based photo-decomposed alignment layer material.

More specifically, the photo-alignment agent is formed by copolymerizing and reacting at least one of a cyclobutane-dianhydride ("CBDA") represented by Chemical Formula 1 and a derivative of the CBDA represented by Chemical Formula 2, and diamine.

[Chemical Formula 1]

[Chemical Formula 2]

In Chemical Formula 2, X1, X2, X3, and X4 are hydrogen or organic compound, and at least one of X1, X2, X3, and X4 has a structure other than hydrogen.

The diamine includes at least one compound represented by Chemical Formula 3 or Chemical Formula 4.

[Chemical Formula 3]

In Chemical Formula 3, X is h is a natural number of about 1 to about 10, and h1 and h2 are natural numbers selected so that the sum of carbon numbers of the alkylene group of X may be about 2 to about 10.

[Chemical Formula 4]

The diamine compound of Chemical Formula 3, including the alkyl group, provides the property of flexibility to the photo-alignment agent. Flexibility is provided to the photo-alignment agent for the liquid crystal by adding a predetermined amount of the diamine compound therein. Thus, compared with a photo-alignment agent in which the compound of Chemical Formula 3 is not added, the anisotropy and photolysis rate of the photo-alignment agent for the liquid crystal may increase.

In an exemplary embodiment, an amount of the diamine is preferably about 10% to about 50% with respect to the total amount of the photo-alignment agent, but is not limited thereto.

When the amount of the compound of Chemical Formula 3 is equal to or less than about 10%, feasibility of the liquid crystal photo-alignment agent is not satisfied, and when the amount of the compound of Chemical Formula 3 is equal to or more than about 50%, the feasibility of the liquid crystal photo-alignment agent is so large that the alignment layer may not serve to align liquid crystals, such that deformation of the alignment layer and an afterimage due to the deformation may occur later.

Further, in the present exemplary embodiment, the photo-alignment agent may include a crosslinking agent including at least one of compounds represented by Chemical Formula 5, Chemical Formula 6, and Chemical Formula 7.

[Chemical Formula 5]
[Chemical Formula 6]

[Chemical Formula 7]

In Chemical Formula 5, Chemical Formula 6, and Chemical Formula 7, n is a natural number of about 3 to about 11, each of m1 to m4 is a natural number of about 1 to about 4 independent of each other, each of A1 and A2 is independently (herein, R is H or a C1 to C3 alkyl group), a C6 to C30 aromatic compound or a C4 to C20 aliphatic cyclic compound, A3 is a C6 to C30 aromatic compound, or a C4 to C20 aliphatic cyclic compound, A4 is independently a single bond, —$CH_2$—, —COO—, —OCO—, —S—, —O—, a C6 to C30 aromatic compound, or a C4 to C20 aliphatic cyclic compound, and X1, X2, X3, X4, X5, X6, X7, X8, X9, and X10 are independently —OH, —$NH_2$, an acrylate group, a vinyl group, or As described above, the crosslinking agent according to the present exemplary embodiment includes the alkylene group (—CH2—), corresponding to the flexible group, and thus the photo-alignment layer formed by using the photo-alignment agent added with the crosslinking agent of the present exemplary embodiment ameliorates the film strength and minimizes deterioration of the afterimage.

Hereinafter, the upper panel 200 will be described.

The common electrode 270 made of a transparent conductor such as ITO, IZO, or the like is formed on the insulation substrate 210 made of transparent glass, plastic, or the like. The alignment layer 21 is coated on the common electrode 270. The alignment layer 21 may be made of an insulating material such as polyimide or the like.

Polarizers (not shown) are provided on outer surfaces of the display panels 100 and 200. Polarization axes of the two polarizers are either substantially parallel or perpendicular to each other. In the case of a reflective liquid crystal display, one of the two polarizers may be omitted.

The liquid crystal layer 3 has positive or negative dielectric anisotropy. The liquid crystal molecules 300 of the liquid crystal layer 3 are aligned so that the long axes thereof may be substantially parallel to or substantially perpendicular to the surfaces of the two display panels 100 and 200 in a state in which an electric field is not present.

In the exemplary embodiment of the liquid crystal display discussed above, the first alignment layer 11*a* is the rubbing alignment layer and the second alignment layer 11*b* is the photo-alignment layer, and each are formed on the first substrate 110; however, the liquid crystal display is not limited thereto. In an alternate exemplary embodiment, the first alignment layer may be an alignment layer aligned by rubbing and the second alignment layer corresponds to a photo-alignment layer that is partially formed on the first alignment layer may be formed on the second substrate 210.

Figure 2:
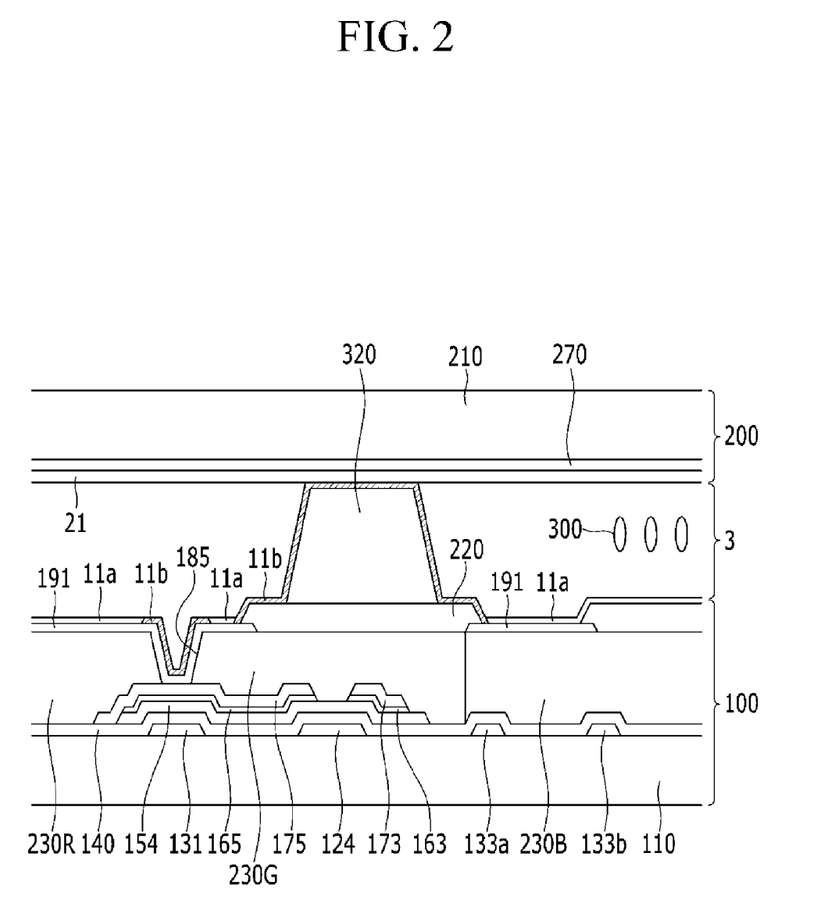
FIG. 2 is a cross-sectional view of another exemplary embodiment of a liquid crystal display.

FIG. 2 is a cross-sectional view of another exemplary embodiment of the liquid crystal display. A detailed description of the same components as those of the liquid crystal display described above with reference to FIG. 1 will not be described.

Referring to FIG. 2, the first alignment layer 11*a* is formed on the pixel electrodes 191 that are disposed on the first substrate 110. In the present exemplary embodiment, the first alignment layer 11a is a rubbing alignment layer that is aligned by rubbing.

Further, the second alignment layer 11b, corresponding to the photo-alignment layer, is formed on the contact hole 185 and the spacer 320 as a stepped portion area that is formed on the lower panel 100.

When the alignment layer is formed in the liquid crystal display according to the exemplary embodiment of FIG. 2, since a photo-alignment layer may be formed on a stepped portion area in which tail-like light leakage may occur, a liquid crystal display in which the aperture ratio and transmittance are improved may be obtained.

Figure 3:
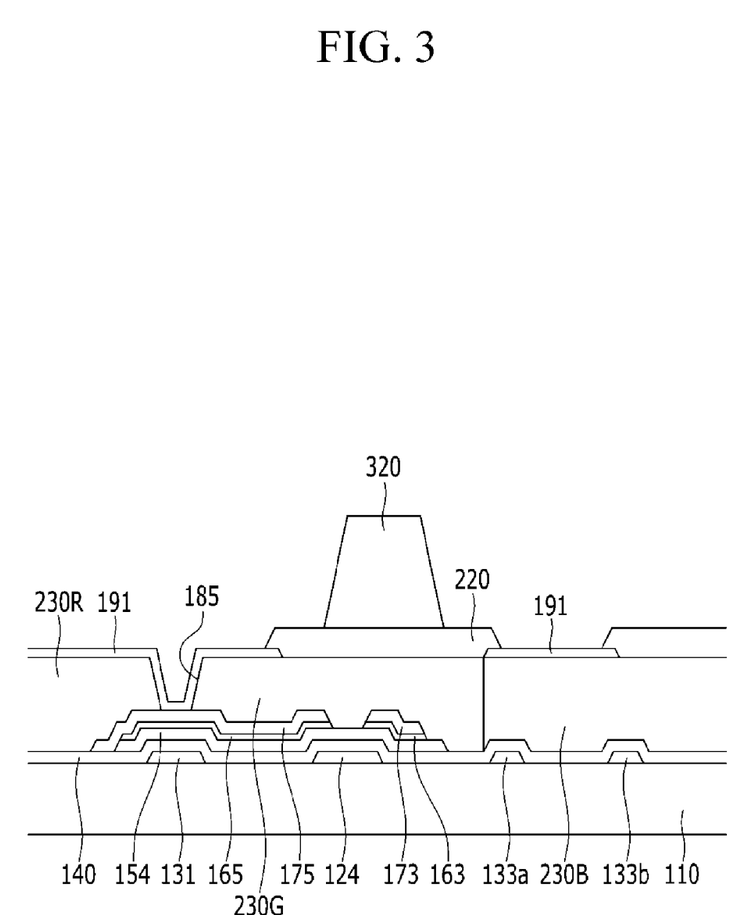
FIGS. 3 to 5 are schematic cross-sectional views which illustrate an exemplary embodiment of a manufacturing method for a liquid crystal display.
Figure 4:
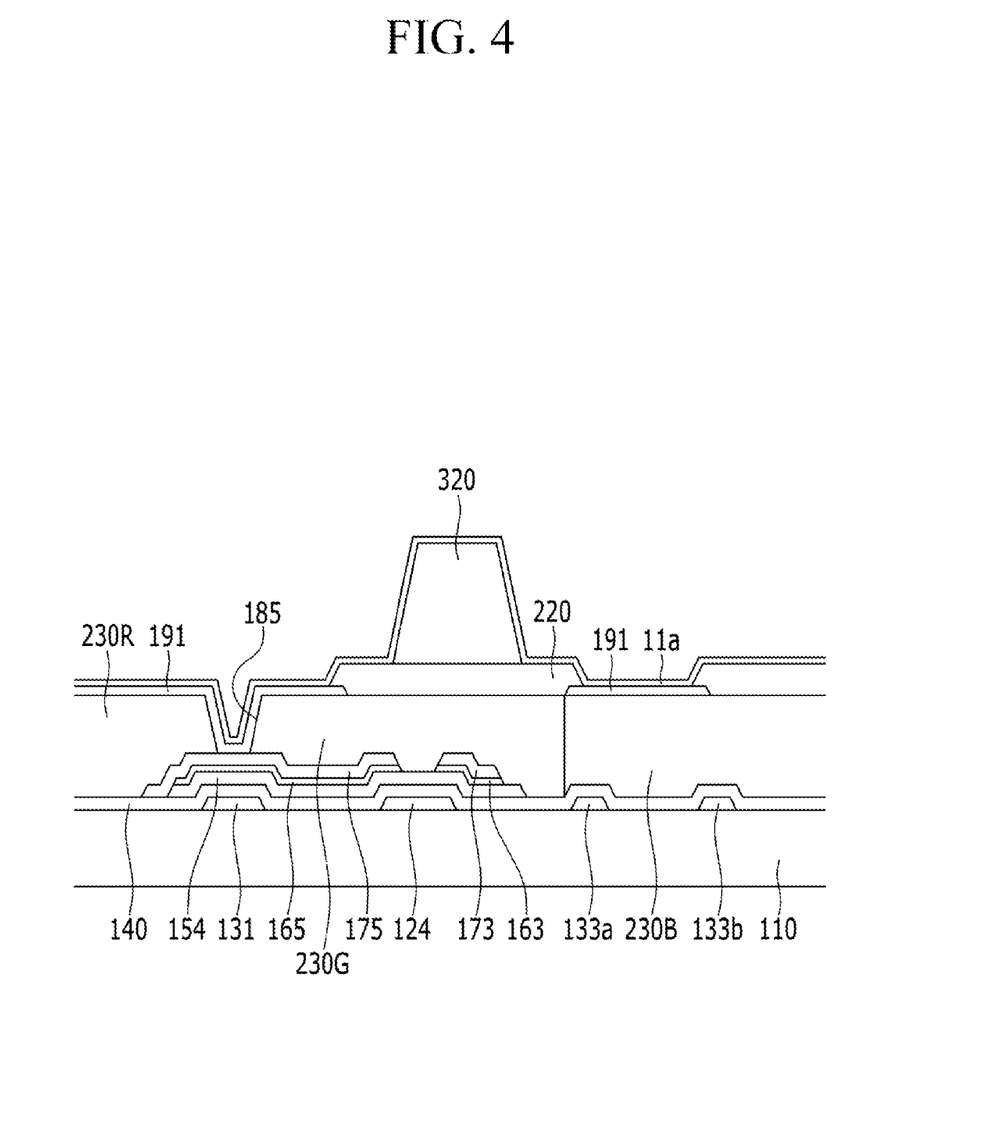
Figure 5:
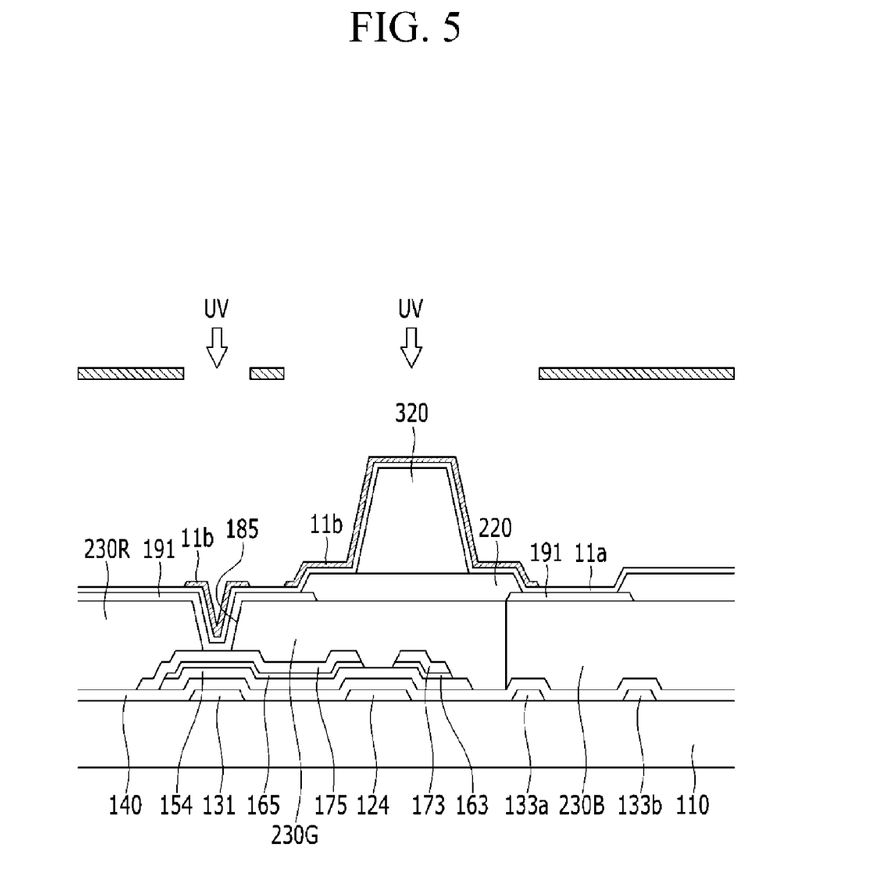

FIGS. 3 to 5 are schematic cross-sectional views which illustrate an exemplary embodiment of a manufacturing method of a liquid crystal display.

Referring to FIG. 3, the light blocking member 220 referred to as a black matrix for covering the thin film transistor and the like is formed on the lower panel 100. The light blocking member 220 includes a plurality of openings that have substantially the same shape as the pixel electrodes 191, and serves to prevent light leakage. The light blocking member 220 may be formed of a photosensitive material having light blocking properties except for the exposed portion thereof.

Figure 6:
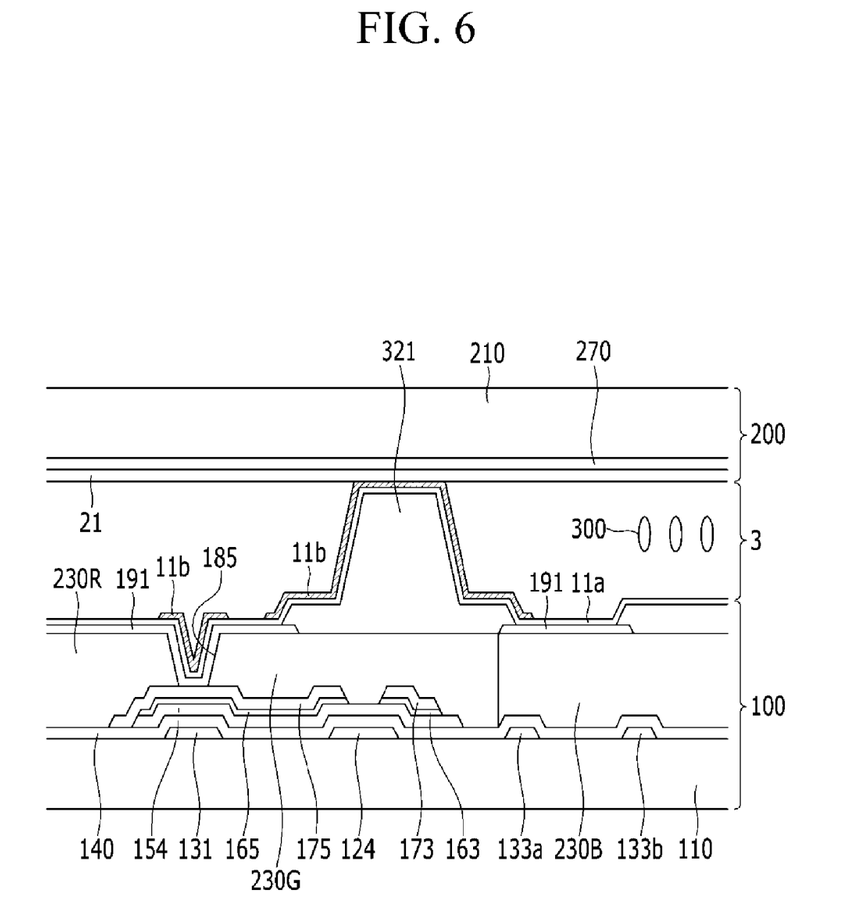
FIG. 6 is a cross-sectional view of another exemplary embodiment of a liquid crystal display.

In the present exemplary embodiment, the spacer 320 is separately formed on the light blocking member 220. In an another exemplary embodiment, referring to FIG. 6, a spacer 321 in which the light blocking member and the spacer are integrally formed by using a slit mask, a half-tone mask, or the like may be provided.

An exemplary method for the manufacture of the liquid crystal display in which the first alignment layer 11a, corresponding to the rubbing alignment layer, and the photo-alignment layer, corresponding to the second alignment layer 11b, are formed will be described with reference to FIGS. 4 and 5.

First, referring to FIG. 4, the first alignment layer 11a is formed on the pixel electrodes 191 and the spacer 320. In the present exemplary embodiment, the first alignment layer 11a is the rubbing alignment layer that is aligned by rubbing. The first alignment agent is coated on the pixel electrodes 191 that are disposed on the lower panel 100. Predetermined directional orientation is provided to the first alignment layer 11a through the rubbing process.

Next, a manufacturing method of the second alignment layer 11b, which is the photo-alignment agent, according to the present exemplary embodiment will be described.
The second alignment agent, corresponding to the aforementioned photo-alignment agent is selectively coated above the spacer 320 or within or on the contact hole 185 that is formed on the light blocking member 220. The coating is accomplished through an inkjet method or the like. The coated photo-alignment agent is then baked. The baking process may include a pre-bake process and a hard-bake process.

Next, polarized light may be irradiated to the photo-alignment agent to impart anisotropy, and the aligned photo-alignment layer may be formed. In an exemplary embodiment, a front exposure may be performed without using a mask, and ultraviolet rays of a wavelength of about 200 nanometers (nm) to about 400 nm may be irradiated to an area in which the photo-alignment layer is formed using a mask. The baking temperature in the process of being baked may be about 210° C. to about 250° C., and the irradiating time of the ultraviolet rays may be about 100 to about 3,600 seconds. The polarized light may have energy of about 0.01 Joules per squared centimeter ($J/cm^2$) to 3.0 $J/cm^2$.

In this exemplary embodiment, the photo-alignment layer may be baked once more (hereinafter, referred to as a second baking process) to enhance alignment.

The second alignment agent, which is the photo-alignment agent according to the present exemplary embodiment, may include a cyclobutane-based photolysis material. More specifically, the copolymer included in the second alignment agent may include at least one of the repeated units that are respectively represented by Chemical Formula 8, Chemical Formula 9, Chemical Formula 10, and Chemical Formula 11.

Chemical Formula 8

Chemical Formula 9

Chemical formula 10

Chemical formula 11

In Chemical Formula 8 and Chemical Formula 9, X may indicate

-continued h may indicate a natural number of about 1 to 10, h1 and h2 may indicate natural numbers that are selected to obtain about 2 to about 10 as a sum of carbon numbers of the alkylene group of X. In Chemical Formula 9 and Chemical Formula 11, X1, X2, X3, and X4 may independently indicate hydrogen, a halogen, or an alkyl group, and at least one of X1, X2, X3, and X4 is not hydrogen.

After forming the second alignment layer 11b, when the second substrate 210 including the upper alignment layer 21 and the common electrode 270 is formed, the liquid crystal display shown in FIG. 1 may be completed.

In the present exemplary embodiment of the liquid crystal display, when the first alignment layer 11a, corresponding to the rubbing alignment layer, is formed and the second alignment layer 11b, corresponding to the photo-alignment layer in the area in which the stepped portion, is simultaneously and partially formed thereon, a rubbing alignment layer having strong alignment anchoring and an improved afterimage obtained by blocking light leakage due to the photo-alignment is obtained.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first substrate and a second substrate facing each other;
a pixel electrode disposed on the first substrate;
a first alignment layer formed on at least one of the first substrate and the second substrate;
a second alignment layer disposed on a same substrate as the first alignment layer; and
a liquid crystal layer interposed between the first substrate and the second substrate;
a light blocking member formed on the first substrate, and
a spacer disposed between the first substrate and the second substrate,
wherein
the first alignment layer is a rubbing alignment layer and the second alignment layer is a photo-alignment layer,
the second alignment layer overlaps a part of the first substrate,
the part of the first substrate is an area in which a step is formed on the first substrate, and
the spacer is disposed on the light blocking member, and the spacer and the light blocking member are integrally formed.

2. The liquid crystal display of claim 1, wherein
the step comprises at least one of the spacer and a contact hole,
and
wherein the pixel electrode is connected with a thin film transistor disposed on the first substrate through the contact hole.

3. The liquid crystal display of claim 1, wherein the second alignment layer is disposed on the spacer.

4. The liquid crystal display of claim 3, further comprising:

a thin film transistor disposed on the first substrate,
wherein a terminal of the thin film transistor and a terminal of the pixel electrode are connected through a contact hole, and
the second alignment layer is disposed inside the contact hole.

5. The liquid crystal display of claim 1, wherein
the second alignment layer is disposed on the first alignment layer, and an entire area of the second alignment layer overlaps the first alignment layer.

6. The liquid crystal display of claim 1, wherein
the second alignment layer is disposed on a same layer as the first alignment layer.

7. The liquid crystal display of claim 1, wherein
the second alignment layer includes a photo-alignment agent that is formed by copolymerizing and reacting at least one of cyclobutanedianhydride represented by the following Chemical Formula 1 and a derivative of the cyclobutanedianhydride represented by the following Chemical Formula 2, and diamine:

[Chemical Formula 1]

[Chemical Formula 2]

where, in Chemical Formula 2, X1, X2, X3, and X4 are hydrogen or an organic compound, and at least one of X1, X2, X3, and X4 has a structure other than hydrogen.

8. The liquid crystal display of claim 7, wherein
the diamine includes at least one compound represented by the following Chemical Formula 3 or Chemical Formula 4:

[Chemical Formula 3]

where, in Chemical Formula 3, X is

-continued $$—O—(CH_2OCH_2)_h—O—,$$

$$—\overset{O}{\overset{\|}{C}}—O(CH_2)_{\overline{h}}O—\overset{O}{\overset{\|}{C}}—,$$

$$—(CH_2)_{h1}—O—(CH_2)_{h2}—, \text{ or}$$

$$(CH_2)_{\overline{h1}}\overset{O}{\overset{\|}{C}}—O(CH_2)_{\overline{h2}},$$

wherein h of Chemical Formula 3 is a natural number of about 1 to about 10, and h1 and h2 of Chemical Formula 3 are natural numbers selected so that the sum of carbon numbers of the alkylene group of X is about 2 to about 10

[Chemical Formula 4]

9. The liquid crystal display of claim 8, wherein an amount of the diamine is about 10% to about 50% with respect to the total amount of the photo-alignment agent.

10. The liquid crystal display of claim 9, wherein
the photo-alignment agent comprises a crosslinking agent comprising at least one of the compounds represented by the following Chemical Formula 5, Chemical Formula 6, and Chemical Formula 7:

[Chemical Formula 5]

[Chemical Formula 6]

[Chemical Formula 7]

where, in Chemical Formula 5, Chemical Formula 6, and Chemical Formula 7, n is a natural number of about 3 to about 11, each of m1 to m4 is a natural number of about 1 to about 4 independent of each other, each of A1 and A2 is independently wherein, R is hydrogen or a C1 to C3 alkyl group,
a C6 to C30 aromatic compound or a C4 to C20 aliphatic cyclic compound, A3 is a C6 to C30 aromatic compound, or a C4 to C20 aliphatic cyclic compound, A4 is a single bond, —$CH_2$—, —COO—, —OCO—, —S—, —O—, a C6 to C30 aromatic compound, or a C4 to C20 aliphatic cyclic compound, and X1, X2, X3, X4, X5, X6, X7, X8, X9, and X10 are each independently —OH, —$NH_2$, an acrylate group, a vinyl group, or 11. A method of manufacturing a liquid crystal display, comprising:
forming a pixel electrode on a first substrate;
forming a common electrode on the first substrate or on a second substrate facing the first substrate; and
coating a first alignment agent on the first substrate;
baking the first alignment agent;
partially coating a second alignment agent on the first alignment agent;
baking the second alignment agent; and
forming a second alignment layer by irradiating polarized light onto the second alignment agent.

12. The method of manufacturing a liquid crystal display of claim 11, wherein the second alignment agent is coated on an area in which a step is formed on at least one of the first substrate and the second substrate.

13. The method of manufacturing a liquid crystal display of claim 12, wherein the second alignment agent is coated on a spacer formed on the first substrate or on the second substrate, and the second alignment agent is coated inside a contact hole formed in the first substrate.

14. The method of manufacturing a liquid crystal display of claim 11, wherein the first alignment agent and the second alignment agent are coated using an inkjet method.

* * * * *